United States Patent [19]

Gutleber

[11] 4,361,886
[45] Nov. 30, 1982

[54] SATELLITE COMMUNICATION SYSTEM

[75] Inventor: Frank S. Gutleber, Little Silver, N.J.

[73] Assignee: The United States of America as represented by the Secretary of the Army, Washington, D.C.

[21] Appl. No.: 174,293

[22] Filed: Jul. 31, 1980

[51] Int. Cl.³ .................................................. H04J 1/02
[52] U.S. Cl. ................................. 370/69.1; 455/12; 370/75; 370/121
[58] Field of Search ................. 370/75, 69, 6; 455/12, 455/13, 24; 370/121

[56] References Cited

U.S. PATENT DOCUMENTS

| | | | |
|---|---|---|---|
| 3,428,898 | 2/1969 | Jacobsen et al. | 455/12 |
| 3,683,279 | 8/1972 | Weinberg et al. | 455/12 |
| 3,824,340 | 7/1974 | Sensney | 455/12 |
| 3,835,253 | 9/1974 | Bond | 455/12 |
| 4,019,138 | 4/1977 | Watanabe et al. | 455/12 |
| 4,191,923 | 3/1980 | Schelisch | 455/12 |

*Primary Examiner*—Douglas W. Olms
*Attorney, Agent, or Firm*—Nathan Edelberg; Jeremiah G. Murray; John W. Redman

[57] ABSTRACT

A loop-around doppler canceling loop is employed between a master ground terminal or node and a slave ground terminal or node for translating a doppler-free reference to the slave terminal by having a local voltage controlled oscillator (VCO) of frequency f at the master terminal lock to a frequency $f_o = f_d$ where $f_o$ is frequency of the primary standard reference clock 8 at the master terminal and $f_d$ is the two-way doppler frequency that exists during transmission between the master and slave ground terminals by way of satellite.

8 Claims, 4 Drawing Figures

SATELLITE COMMUNICATION SYSTEM

The invention described herein may be manufactured, used, and licensed by or for the Government for governmental purposes without the payment to me of any royalty thereon.

This invention relates to a frequency division multiple access satellite communication system which achieves doppler-free reception and transmission at each ground terminal (node) accessing the satellite. By eliminating the doppler frequency variations at all user ground terminals for both timing and for message traffic, a single primary ultra-stable clock can be translated to all said ground terminals, so that the video pulse repetition rate within which message bits occur is maintained within very precise limits.

BACKGROUND OF THE INVENTION

The system of the invention uses a loop-around transmission between a master ground terminal and each slaved ground terminal with the phase or timing being controlled at the master station. The doppler canceling loop translates a doppler-free primary standard clock to each slave ground terminal. Each slave terminal then uses the received doppler-free timing clock as its standard in a doppler canceling loop-around timing system to control the frequency of its transmitted signal. The doppler frequency variation at each ground terminal is thereby eliminated for all the slave satellite ground terminals (nodes) accessing the satellite, and a synchronous network for all ground and space trunk transmission is provided without the need for an expensive primary or secondary time standard at all of the several ground terminals.

The message traffic channels sent over the satellite link all are received completely free of any doppler frequency variation, thus eliminating the need for any of the large buffers normally required at the satellite ground terminals.

DESCRIPTION OF THE INVENTION EMBODIMENTS

Figure 1:
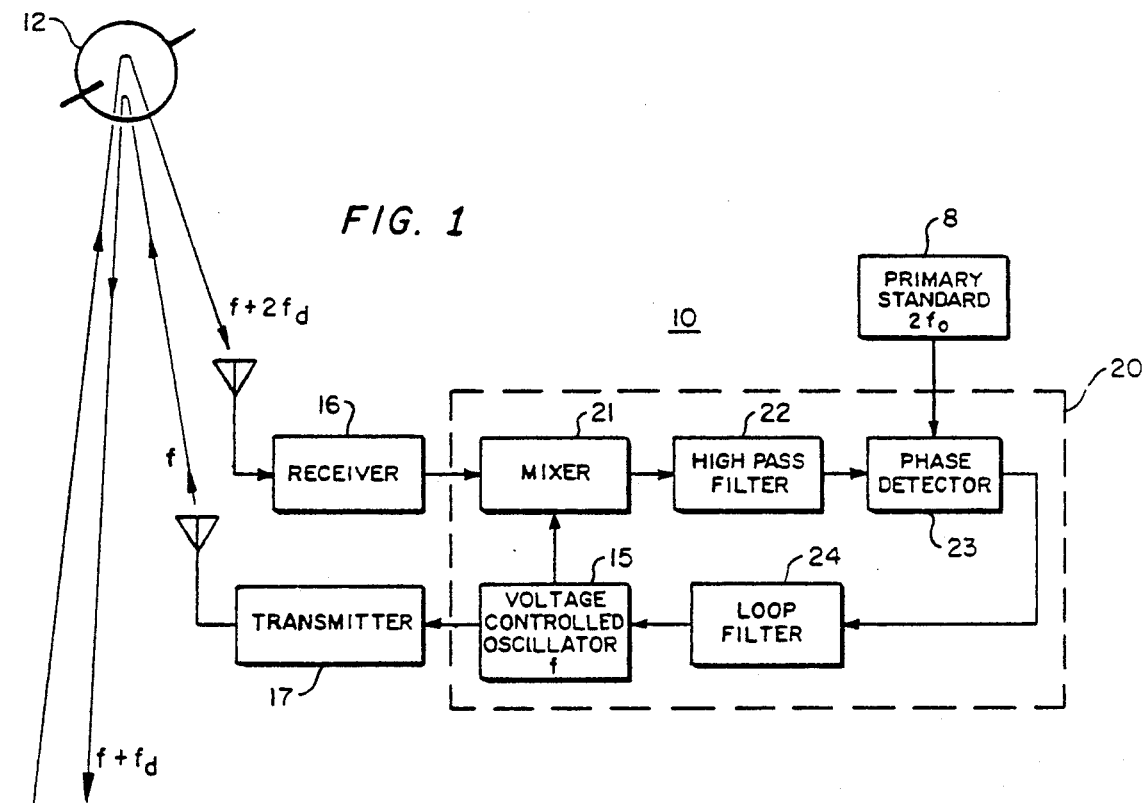
FIG. 1 is a block diagram of an embodiment of the invention using a loop-around doppler canceling loop for translating a doppler-free reference frequency signal of great stability at master ground terminal of a satellite communication system to a slave ground terminal.

The basic ideas involved in the invention are illustrated in FIG. 1. A loop-around doppler canceling loop is employed between a master ground terminal or node 10 and a slave ground terminal or node 11 for translating a doppler-free reference to the slave terminal by having a local voltage controlled oscillator (VCO) 15 of frequency f at the master terminal 10 lock to a frequency $f_o - f_d$ where $f_o$ is frequency of the primary standard reference clock 8 at the master terminal 10 and $f_d$ is the two-way doppler frequency that exists during transmission between the master and slave ground terminals by way of satellite 12.

The output of the voltage controlled oscillator 15 of frequency f is transmitted as a video signal on a radio frequency carrier by transmitter 17 by way of the satellite 12 and back down to the slave ground terminal 11. This video signal is received by receiver 26 and is shifted by $f_d$ at the slave terminal 11 owing to the relative motion of the ground terminals and the satellite 12, and the resulting received signal of frequency $f + f_d$ then is transmitted on the same rf carrier by transmitter 27 back to the master ground terminal 10 via the satellite 12. The signal is shifted in frequency by $2f_d$ by the time it is received by receiver 16 at the master node 10 and this frequency $f + 2f_d$ is mixed with the VCO frequency in mixer 21 which forms part of a phase lock loop 20 at master node 10. The sum frequency out of mixer 21, viz., $2f + 2f_d$, is a high frequency just above the frequency 2f and is separated from the low difference frequency $2f_d$ by high pass filter 22. The output of filter 22 then is fed to the phase detector 23 and compared in phase with twice the reference clock frequency $f_o$ which is derived from a primary standard clock 8, such as a cesium atomic clock. Any transients or ac components in the output of phase detector 22 are removed by loop filter 24 and applied as a locking voltage for the voltage controlled oscillator 15. The VCO frequency f will vary in proportion to the loop error control voltage until the input to the phase detector 23 is exactly equal to twice the clock frequency or $2f_o$. At lock, the frequency relationship attained is $2f + 2f_d = 2f_o$ or $f = f_o - f_d$. This video signal of frequency $f_o - f_d$ then is transmitted by transmitter 17 at the master node 10 by way of satellite 12 to the slave node 11; this signal also undergoes a doppler frequency shift $f_d$. The frequency of the timing signal received by the receiver 26 at slave ground terminal 11 is therefore $f_o - f_d + f_d = f_o$; that is, the timing signal received by the slave node 10 has a frequency equal to the primary clock standard $f_o$, and is doppler-free.

In the preceding discussion, it has been assumed that the doppler frequency shift is positive. If the doppler frequency shift, in fact, is negative, owing, for example, to the satellite 12 receding from the master ground terminal 10 and the slave ground terminal 11, the frequency f of the video signal transmitted from the master terminal 10 is shifted to $$f - \frac{f_d}{2}$$

at the satellite, and, after retransmission from the satellite, becomes $f - f_d$ at the receiver 26 of the slave terminal 11. The signal of frequency $f - f_d$ retransmitted by the transmitter 27 of slave terminal 11 becomes $$f - \frac{3f_d}{2};$$

after retransmission from the satellite 12, the signal arrives at the receiver 16 of the master terminal 10 at a frequency $f-2f_d$. The output of mixer 21 is $f+f-2f_d=2f-2f_d$. The low difference term $-2f_d$ is removed by means of the high pass filter, leaving only the sum term $2f-2f_d$. The VCO 15 becomes locked when the dc control voltage from loop filter 24 becomes zero; this corresponds to the condition $2f_o=2f-2f_d$ or $f=f_o+f_d$. The signal transmitted from transmitter 17 of master ground terminal 10 is now of frequency $f_o+f_d$. After undergoing a doppler shift of $-f_d$ after passage via satellite 12, the frequency of the video timing signal received at receiver 26 of the slave ground terminal 11 is $f_o+f_d-f_d=f_o$. In summary, the proper timing signal translation is accomplished whether or not the doppler shift is considered positive or negative, that is, whether or not the satellite is moving consistantly toward or away from the ground terminals 10 and 11.

Figure 2:
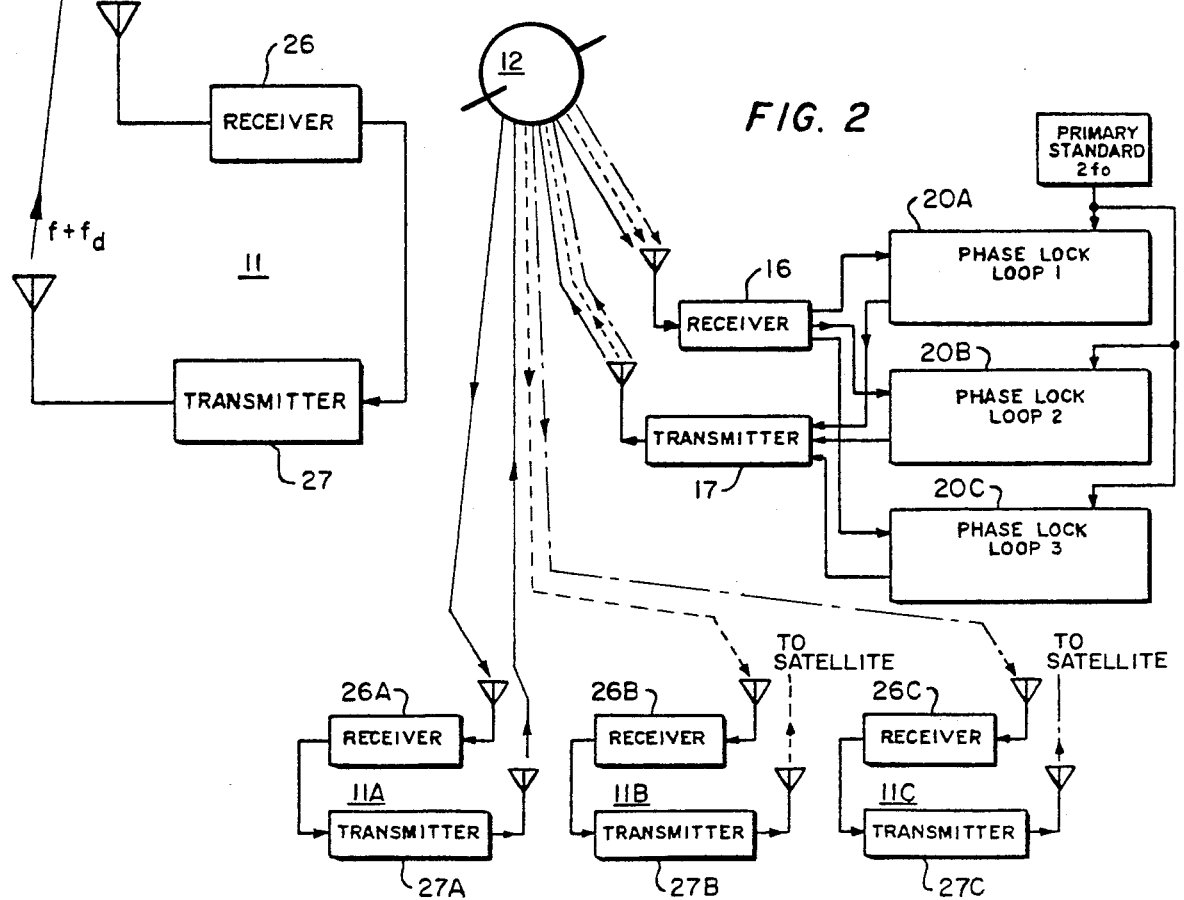
FIG. 2 is a block diagram of a system similar to that of FIG. 1 wherein the master ground terminal is adapted to translate a doppler-free timing signal from a master ground terminal to a plurality of slave ground terminals.

In FIG. 2, a system is illustrated in which several slave nodes 11A, 11B and 11C are time-controlled from the master node 10.

It should be understood that, in practical satellite networks, any combination of the several ground terminals, either master or slave, may, at any given instant, be in motion at some particular velocity of its own.

For each of the slave terminals, the doppler frequency shift will be different because of the difference in relative velocity of the satellite and the ground terminals. Consequently, separate phase lock loops 20A, 20B and 20C (loops numbers 1, 2 and 3) are used. A primary standard (clock) 8 supplies a clock signal of very accurately maintained frequency $2f_o$ to one input of the respective phase detector of the respective phase lock loop. If the frequencies of the VCO of the phase lock loops numbers 1, 2 and 3 are f, $f^I$ and $f^{II}$, respectively, the frequency of the video signals received by receivers 26A, 26B and 26C over respective carrier frequencies $f_{c1}$, $f_{c2}$ and $f_{c3}$ are, respectively, $f+f_d$, $f^I+f^I_d$ and $f^I+f^{II}_d$, where the doppler frequencies differ from one another for reasons above stated. These video frequency signals are received via satellite 12 over separate rf carriers by receiver 10 at master terminal 10 and are supplied to the respective phase lock loops 1 to 3. The action of the individual phase lock loops is such that the VCO of phase lock loops numbers 1, 2 and 3 are locked when the respective conditions $f_o=f-f_d$, $f_o=f'-f_d'$ and $f_o=f''-f_d''$ are met. These video signals are then retransmitted by transmitter 12 at master terminal 10 over corresponding carrier frequencies $f_{c1}$, $f_{c2}$ and $f_{c3}$ by way of the satellite 12 where, after further doppler shifts of $f_d$, $f^I_d$ and $f^{II}_d$, these video signals are superimposed on separate carrier frequencies $f_{c1}$, $f_{c2}$ and $f_{c3}$ received at the receivers 26A, 26B and 26C of slave terminals 11A, 11B and 11C are at the frequency $f_o$ of the clock at the master ground terminal 10.

Figure 3:
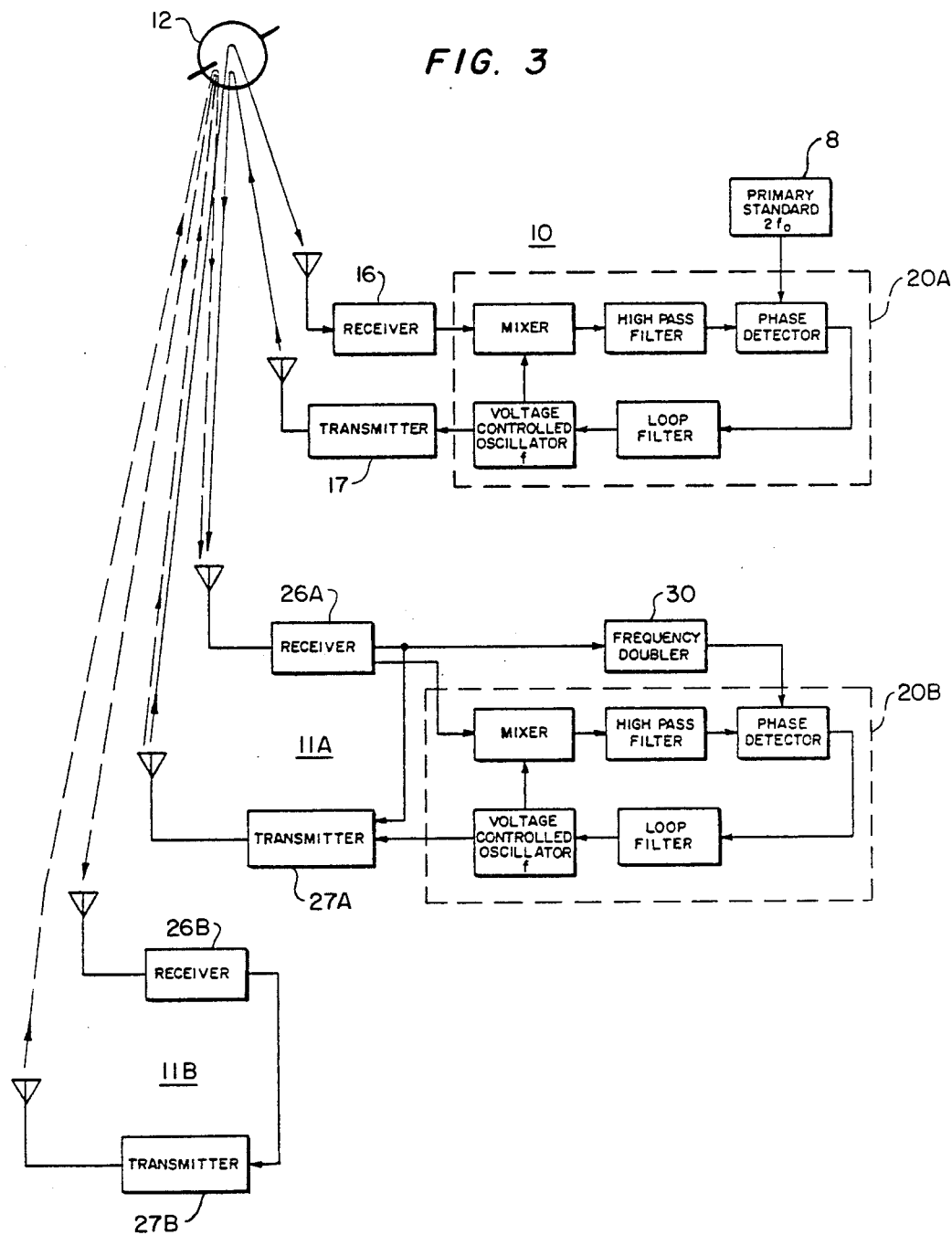
FIG. 3 is a block diagram of a system similar to that of FIG. 1 wherein a first slave ground terminal which is controlled in timing by the master ground terminal itself translates a doppler-free reference frequency (timing) signal to a second slave ground terminal.

Referring now to FIG. 3, a system is shown wherein one of the slave ground terminals 11A, having a received timing video signal of frequency $f_o$ from the master terminal 10, in the manner already disclosed in FIG. 1, can, itself, be used as a master terminal for translating its timing signal of frequency $f_o$ to another slave terminal 11B.

As in the system of FIG. 1, the transmitter 17 of the master terminal 10 transmits the video frequency VCO signal of frequency f on a radio frequency carrier of frequency $f_{c1}$ via satellite 12 to the receiver 26A of slave terminal 11A. The video signal on carrier $f_{c1}$ actually received by receiver 26A will have been doppler shifted to $f+f_d$; this received signal is retransmitted on carrier $f_{c1}$ by transmitter 27A of slave terminal 11A by way of the satellite 12 and is received by receiver 16 at the master terminal after undergoing a further doppler shift to $f+2f_d$. This frequency is supplied to the mixer in the phase lock loop of the master terminal 10. After phase comparison and filtering, as already described, the VCO of the master terminal phase lock loop 20A locks to the frequency $f_o-f_d$. This video timing signal $f_o-f_d$ is transmitted on radio frequency carrier $f_o$ to receiver 26A of slave terminal 11 by way of satellite 12 and arrives at the slave terminal 11 with the frequency $f_o-f_d+f_d$ or $f_o$. The video signal of frequency $f_o$ is transmitted by transmitter 27A over a second carrier frequency $f_{c2}$ via satellite 12 to the receiver 26B of slave terminal 11B where it arrives at a video frequency $f_o+f^I_d$ (a different doppler frequency than $f_d$ for reasons already given in connection with the description of FIG. 2). After retransmission by transmitter 27A at slave terminal 11B of rf carrier frequency $f_{c2}$ by way of satellite, the video frequency $f_o+f_d$ is received by receiver 26A of slave terminal 11A after undergoing a doppler frequency shift of $f^I_d$ or at a frequency of $f_o+2f^I_d$. This frequency is applied to the mixer of phase lock loop 20B. The output of this mixer is $2f^I+2f^I_d$. The sum component is passed by the high pass filter in the phase lock loop 20B to the phase detector thereof and a comparison made with the frequency $2f_o$ derived by multiplying the video signal $f_o$ previously received at slave terminal 11A on carrier frequency $f_{c1}$ by multiplier 30 so that the VCO of phase lock loop 20B is locked at a frequency $f^I=f_o-f^I_d$.

This video signal $f^I=f_o-f^I_d$ now is transmitted by transmitter 27A over carrier frequency $f_{c2}$ to slave terminal 11A via satellite 12 to the slave terminal 11B where its receiver 26B receives a doppler shifted frequency $f_o-f^I_d+f^I_d=f_o$. In this manner, the video timing signal of frequency $f_o$ at the slave ground terminal 11 has been translated to the slave ground terminal 11B.

This process can be repeated from one slave ground terminal to the next slave ground terminal; however, such a system has the disadvantage that disablement of any of a given one of the slave terminals will prevent further translation of an accurate timing signal to succeeding slave ground terminals.

Figure 4:
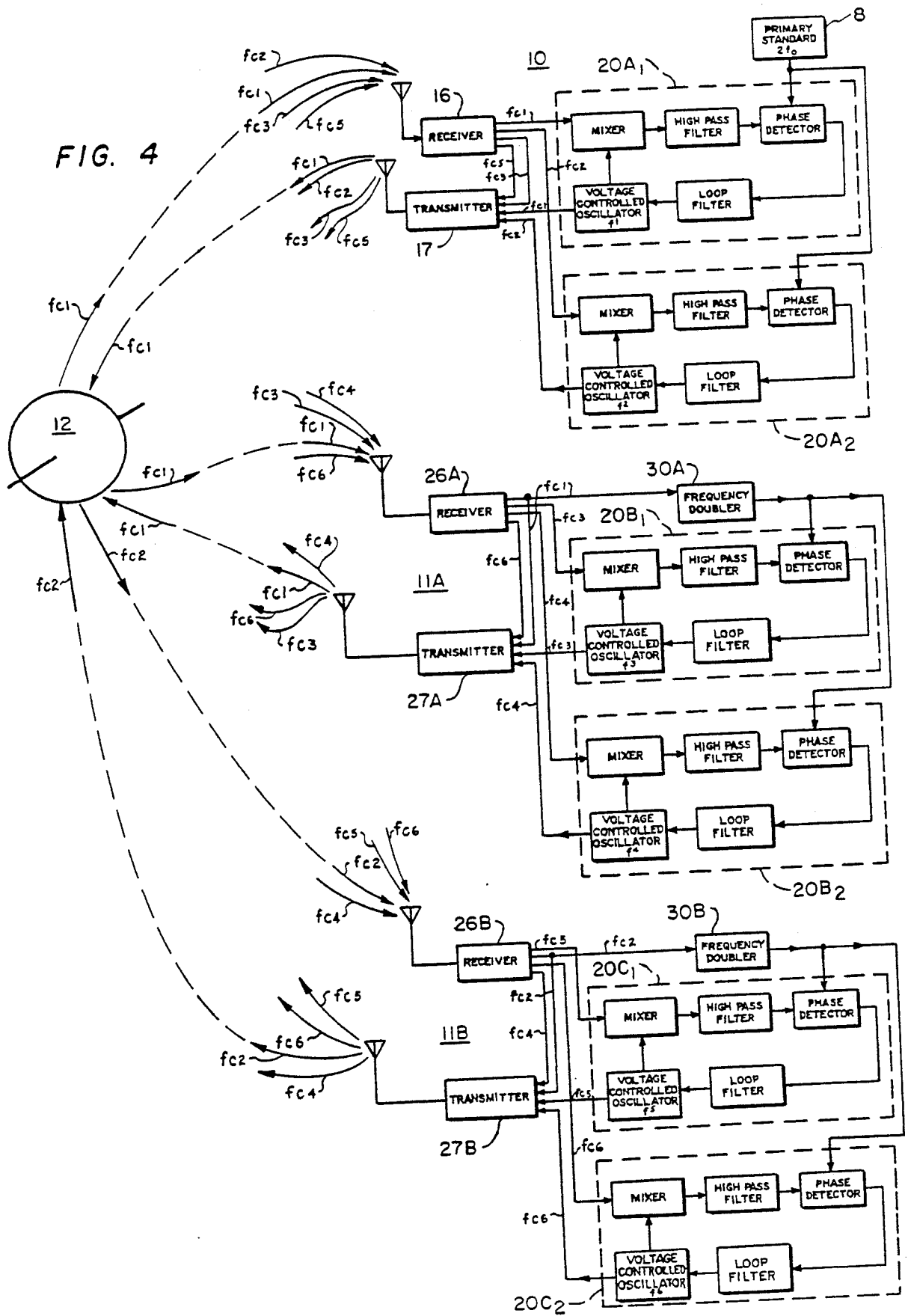
FIG. 4 is a block diagram of a system in which, in addition to the master ground terminal providing a timing signal to a plurality of slave ground terminals, provides for doppler-free message traffic between all ground terminals (master and slave).

Referring now to FIG. 4, a system is shown wherein the master ground terminal 10 provides timing signals of frequency $f_o$ to slave ground terminals 11A and 11B, and also wherein each of the three ground terminals 10, 11A and 11B can send message traffic to one another as well as receive message traffic from each of the other ground terminals.

The video frequency timing signal of frequency f' from the VCO of phase lock loop $20A_1$ of master terminal 10 is superimposed on a radio frequency carrier of frequency $f_{c1}$ at the transmitter 17 and is transmitted by way of satellite 12 to the receiver 26A of slave ground terminal 11A for timing purposes. Although the carrier $f_{c1}$ is generated in transmitter 17, the description $f_{c1}$ appears on the line between the VCO of phase lock loop $20A_1$ and transmitter 17 for the sake of ease of reading. The same is true of the radio frequency carriers of frequency $f_{c2}$, $f_{c3}$, $f_{c4}$, $f_{c5}$ and $f_{c6}$ which are designated as being in the respective connections between the corresponding VCO of the phase lock loop and the corresponding transmitter.

The video frequency timing signal from the VCO of phase lock loop $20A_2$ of master terminal 10 is superimposed on the carrier $f_{c2}$ at transmitter 17 and is transmitted by way of satellite 12 to receiver 26B of slave ground terminal 11B for timing purposes. As already explained, the VCO frequency $f^I$ on carrier $f_{c1}$ is received via satellite 12 by receiver 26A of slave ground terminal 11A as a video frequency $f^I+f_d$ on carrier $f_{c1}$ and is retransmitted via satellite 12 from transmitter 27A of slave ground terminal 11A to the receiver 16 of the master terminal 10 where the video frequency superimposed on carrier $f_{c1}$ is shifted to $f^I+2f_d$. This signal is supplied to the mixer of phase lock loop $20A_1$ and the sum output $2f^I+2f_d$ applied to the phase detector along with the output $2f_o$ from primary standard 8. The action of the phase lock loop $20A_1$ at the master ground terminal is such that the VCO of loop $20A_1$ is locked to a frequency $f_o-f_d$. This frequency $f_o-f_d$ is transmitted on carrier $f_{c1}$ via satellite 12 to receiver 26A of slave terminal 11A. This video signal, after a doppler shift $f_d$, appears at the receiver 26A of slave ground terminal 11A as an accurate timing video signal of frequency $f_o$.

Similarly, the VCO frequency $f^2$ of the VCO of phase lock loop $20A_2$ in the master node 10 (which is slightly different from the frequency $f^I$ of the VCO in phase lock loop $20A_1$) is transmitted over radio frequency carrier $f_{c2}$ by transmitter 17 via satellite 12 to the slave ground terminal 11B. The receiver 26B receives a video signal of frequency $f^2+f^I_d$ on rf carrier $f_{c2}$. After retransmission by transmitter 27B to the receiver 16 of master terminal 10 via satellite 12, the video signal on carrier $f_{c2}$ has undergone a shift of frequency to $f^2+2f^I_d$. The phase lock loop $20A_2$ serves to lock the VCO therein to a frequency $f_o-f^I_d$. After this video signal is transmitted by transmitter 17 over the carrier $f_{c2}$ via satellite 12 to the receiver 26B of slave terminal 11B, the timing signal of frequency $f_o$ appears at the receiver 26B of slave node 11B.

Message traffic also can be transmitted by transmitter 17 of the master ground node 10 over rf carrier $f_{c1}$ to the slave ground node 11A and over rf carrier $f_{c2}$ to slave node 11B. Each slave ground node can use its received clock timing signal of frequency $f_o$ as its reference frequency in a similar loop around phase lock loop to control the transmission of messages to the other ground terminals. Just as in the case of the master ground terminal 10, each slave node needs as many phase lock loops—and also as many separate radio frequency carriers—as there are ground terminals with which that slave node desires to communicate. This is so because there must be retransmission via satellite back to the node to be communicated with to the given slave node on the same carrier in order to obtain at the given slave node a timing control signal $f_o-f_d$ at the phase lock loop of the given slave node for transmission to the node to be communicated with which will arrive by way of satellite at the latter node at the frequency $f_o-f_d+f_d=f_o$.

As shown in FIG. 4, the timing control signal from the VCO of frequency $f^3$ of phase lock loop $20B_1$ of slave node 11A together with accompanying message data, is transmitted over carrier $f_{c3}$ by transmitter 27A via satellite 12 to the receiver 16 of master terminal 10. This video timing signal arrives on carrier frequency $f_{c3}$ at the receiver 16 doppler shifted to $f^3+f^{II}_d$ and is retransmitted over carrier $f_{c3}$ by transmitter 17 on carrier frequency $f_{c3}$ via satellite 12 to the receiver 16 of master ground terminal 10 where it is further doppler shifted to a frequency $f^3+2f^{II}_d$. This signal is applied to the mixer of phase lock loop $20B_1$ at slave ground terminal 11A where it is combined with the output of the VCO to obtain a frequency $2f^3+2f^{II}_d$.

Note that the frequency $f_o$ is available at the input of frequency doubler 30A as a result of reception at receiver 26A of the timing signal of frequency $f_o$ on radio frequency carrier $f_{c1}$.

The phase detector of phase lock loop $20B_1$ responds to this frequency and to the frequency $2f_o$ which is provided at the output of frequency doubler 20A to provide for lock of the VCO at a frequency $f^3-f^{II}_d$. This signal is then transmitted over the carrier $f_{c3}$ by transmitter 27A via satellite 12 to the master terminal 10 where it is received, after a doppler shift $f^{II}_d$, at the desired doppler free accurate frequency $f_o$. This establishes an accurate pulse repetition interval $$=\frac{1}{f_o}$$

within which the message data occurs which is to be sent from slave terminal 11A to the master ground terminal 10.

In order to send message data within the desired accurately maintained pulse repetition period $$\frac{1}{f_o}$$

from slave terminal 11A to slave terminal 11B, the phase lock loop $20B_2$ is used and the video output of the VCO of this loop is transmitted over rf carrier frequency $f_{c4}$ by transmitter 27A by way of satellite 12 to the receiver 26B of slave terminal 11B. The video signal frequency has undergone a doppler shift to $f^4+f^{III}_d$. This frequency is retransmitted by transmitter 27B on the same carrier $f_{c4}$ by way of satellite 12 to receiver 26A at slave ground terminal 11A, the frequency at receiver 26A has been shifted to $f^4+2f^{III}_d$ and is applied to the mixer of phase lock loop $20B_2$; the sum output of the mixer of this phase lock loop is $2f^4+2f^{III}_d$ and after comparison with the output of frequency doubler 30A (see previous application for details of operation of doubler 30A) in the phase detector of phase lock loop $20B_2$, the VCO frequency is locked to $f_o-f^{III}_d$. After passage of this signal from the VCO by way of transmitter 27A over carrier $f_{c4}$ by way of satellite 12, the timing video signal is received at receiver 26B of slave terminal 11B at a frequency $f_o-f_d'''+f_d'''=f_o$.

If message communication is desired between slave ground terminal 11B and the master ground terminal 10, the phase lock loop $20C_1$ is used, together with frequency doubler 30B. The video signal of frequency $f^5$ from the VCO of phase lock loop $20C_1$ is transmitted by transmitter 27B over radio frequency carrier $f_{c5}$ by way of satellite 12 to the receiver 16 at master terminal 10 where it arrives at a frequency $f^5+f^{IV}_d$. This signal is retransmitted over rf carrier $f_{c5}$ by transmitter 17 at the master terminal 10 by way of satellite 12 to the receiver 26B at slave ground terminal 11B. This received signal arrives on rf carrier frequency $f_{c5}$ at a frequency $f^5+2f^{IV}_d$. This video signal is applied to the mixer of phase lock loop $20C_1$ and the sum frequency $2f^5+2f^{IV}_d$ is applied to the phase detector of phase lock loop $20C_1$ along with the output of frequency $2f_o$ from frequency doubler 30B. The frequency doubler is inputted from the video frequency $f_o$ which is received by receiver 26B over carrier frequency $f_{c2}$ from the master terminal 10. The phase lock loop $20C_1$ serves to lock the VCO thereof at a frequency $f_o - f^{IV}{}_d$. This video signal from the VCO is then transmitted by transmitter 27B on carrier $f_{c5}$ by way of satellite 12 to the receiver 16 of master terminal 10 where it arrives as a doppler shifted video frequency signal of frequency $f_o - f^{IV}{}_d + f^{IV}{}_d = f_o$.

If message communication is desired between slave terminal 11B and the slave terminal 11A, the phase lock loop $20C_2$ is used, together with frequency doubler 30B. The video signal of frequency $f^6$ from the VCO of phase lock loop $20C_2$ is transmitted by transmitter 27B over radio frequency carrier $f_{c6}$ by way of satellite 12 to the master terminal's receiver 16 where it arrives at a frequency $f^6 + f^V{}_d$. This signal is retransmitted over rf carrier $f_{c6}$ by transmitter 17 at the master terminal 10 by way of satellite 12 to the receiver 26A at slave terminal 11A. This received signal arrives on rf carrier frequency $f_{c6}$ at a frequency $f^6 + f^V{}_d$. This video signal then is applied to the mixer of phase lock loop $20C_2$ and the sum frequency $2f^6 + 2f^V{}_d$ is applied to the phase detector of phase lock loops $20C_2$ along with the output of frequency $2f_o$ from frequency doubler 30B. The frequency doubler 30B is inputted from the video signal of frequency $f_o$ which has been received by receiver 26B over carrier $f_{c2}$ from the master terminal 10, as previously explained. The phase lock loop $20C_2$ serves to lock the VCO thereof at a frequency $f_o - f^V{}_d$. This video signal from the VCO is then transmitted by transmitter 26A of master terminal 10 where it arrives at a doppler shifted timing signal of frequency $f_o - f^V{}_d + f^V{}_d = f_o$.

If a given slave terminal does not wish to communicate with another node, it does not need either a phase lock loop or an rf carrier for this purpose since there need be no retransmission back from said other node in the appropriate carrier to the given slave terminal. For example, if there is no need for slave terminal 11A sending data to slave terminal 11B, the carrier of frequency $f_{c4}$ is not needed (no VCO required) and the phase lock loop $20B_2$ can be eliminated. This does not preclude slave terminal 11B from communicating with terminal 11A; in this case, slave terminal needs phase lock loop $20C_2$ and the transmitter will generate an rf carrier of frequency $f_{c6}$.

What is claimed is:

1. A frequency division multiple access satellite communication system having a master ground node and at least one slave ground node, each of said nodes comprising
   a primary frequency standard at said master node for supplying a precisely maintained standard frequency clock $f_o$;
   a phase lock loop at said master node including a voltage controlled oscillator of frequency f which establishes the pulse repetition interval during which message information occurs,
   means for transmitting from said master node by way of said satellite on a suitable radio frequency carrier the video signal of frequency f from said voltage controlled oscillator to said slave node which arrives at said slaved node shifted in frequency by $f_d$ where $f_d$ is the doppler shift encountered during the transmission of energy between said nodes owing to the relative motion between said satellite and said nodes,
   means at said slave node for retransmitting on said same carrier by way of said satellite to said master node the doppler-shifted video signal received at said slave node which arrives at said master node with the frequency $f + 2f_d$,
   said phase lock loop responding to the received doppler-shifted timing control signal of frequency $f + 2f_d$ on said radio frequency carrier and to the frequency-doubled output of said primary frequency standard for locking the frequency of said voltage controlled oscillator to a value $f_o - f_d$, and
   means for transmitting by way of said satellite from said master node to said slave node the video signal of pulse repetition frequency $f_o - f_d$ which arrives doppler-shifted at said slave node as a timing signal at the standard frequency $f_o$.

2. The system of claim 1 wherein said phase lock loop includes a mixer receptive of said video signal of frequency $f + 2f_d$ and of said voltage controlled oscillator output of frequency f for deriving a mixer output of frequency $2f + 2f_d$ and a phase detector responsive of said frequency-doubled output of frequency $2f_o$ and said mixer output for deriving a control voltage which locks the voltage controlled oscillator when $f = f_o - f_d$.

3. The system of claim 1 further including an additional slave ground node controlled by said one slave ground node,
   said one slave node having a phase lock loop including a voltage controlled oscillator of frequency $f^I$ which may differ from the frequency f at the master node,
   means for transmitting from said one slave node by way of said satellite on a second radio frequency carrier distinct from the first radio frequency carrier from said master node a video signal of frequency $f^I$ to said additional slave node which arrives at said additional slave node doppler shifted in frequency by $f^I{}_d$ owing to the relative motion of said satellite and the slaved nodes,
   means for retransmitting on said second radio frequency carrier by way of said satellite to said one slave node the doppler-shifted video signal received at said second slave node,
   said phase lock loop of said one slave node responding to the frequency doubled timing control signal of frequency $f_o$ received on the first radio frequency carrier from said master node and to the doppler-shifted video signal of frequency $f^I + 2f^I{}_d$ received on the second radio frequency carrier for locking the frequency $f^I$ to a value $f_o - f^I{}_d$, and
   means for transmitting by way of said satellite from said one slave node to said additional slave node the video signal of frequency $f_o - f^I{}_d$ which arrives doppler-shifted by $f^I{}_d$ at said second slave node at the standard frequency $f_o$.

4. The system of claim 3 wherein said phase lock loop of said one slave node includes a mixer receptive of said timing control signal of frequency $f^I + 2f^I{}_d$ and of said voltage controlled oscillator output of frequency f for deriving a mixer output of frequency $2f^I + 2f^I{}_d$ and also a phase detector responsive to said mixer output and to frequency doubled output of the signal of frequency $f_o$ received on the first radio frequency carrier from said master node for deriving a control voltage which locks the voltage controlled oscillator of the phase lock loop of said one slave node when $f^I = f_o - f^I{}_d$.

5. The system of claim 1 including n slave nodes to be controlled by said master node wherein
   said master node comprises n phase lock loops connected to respective voltage controlled oscillators from which are derived a corresponding video signal, means for transmitting each of said video signals by way of said satellite over a separate carrier frequency to a corresponding one of said slave nodes, receiving means at each of said slave nodes tuned to respond to a distinct one of said carrier frequencies transmitted by way of said satellite from said master node, and a given one of said slave nodes including means for transmitting to said master node by way of said satellite over the corresponding carrier frequency the doppler-shifted timing control signal received at that given slave node from said master node by way of said satellite.

6. The system of claim 5 wherein each of said phase lock loops is supplied by said primary frequency standard and is responsive to a different one of said carrier frequencies.

7. The system of claim 5 wherein each of said slave nodes includes a phase lock loop for each system node with which that slave node desires to communicate and wherein the means for transmitting at each of said slave nodes generates a separate radio frequency carrier for each other system node with which that slave node desires to communicate.

8. The system of claim 5 wherein each of said n system nodes has n phase lock loops and produces n radio frequency carriers to permit message interchange between each of said nodes and all other nodes.

* * * * *